United States Patent [19]

Plonsker et al.

[11] 4,025,451

[45] May 24, 1977

[54] SULFURIZED MANNICH BASES AS LUBRICATING OIL DISPERSANT

[75] Inventors: Larry Plonsker, Baton Rouge, La.; Robert E. Malec, Birmingham, Mich.

[73] Assignee: Ethyl Corporation, Richmond, Va.

[22] Filed: June 6, 1975

[21] Appl. No.: 584,519

Related U.S. Application Data

[62] Division of Ser. No. 397,414, Sept. 14, 1973, Pat. No. 3,904,595.

[52] U.S. Cl. .................................. 252/47.5; 252/47
[51] Int. Cl.² .......................................... C10M 1/38
[58] Field of Search ................................ 252/47.5

[56] References Cited

UNITED STATES PATENTS

| | | |
|---|---|---|
| 2,652,367 | 9/1953 | Adelson ........................ 252/47.5 X |
| 3,368,972 | 2/1968 | Otto ................................... 252/47.5 |
| 3,451,166 | 6/1969 | Panzer ............................... 252/47.5 |
| 3,600,327 | 8/1971 | Hu ................................ 252/47.5 X |
| 3,600,372 | 8/1971 | Udelhofen et al. ........... 252/47.5 X |
| 3,904,595 | 9/1975 | Plonsker et al. .............. 252/47.5 X |

*Primary Examiner*—Delbert E. Gantz
*Assistant Examiner*—Andrew H. Metz
*Attorney, Agent, or Firm*—Donald L. Johnson; Robert A. Linn; Joseph D. Odenweller

[57] ABSTRACT

Dispersancy, wear and corrosion properties of lubricating oil are improved by addition of a product made by mixing at about 50°–300° C about 1–20 parts of sulfur with about 100 parts of the condensation product made by reacting a high molecular weight alkylphenol, formaldehyde and a reactive amine. Excess sulfur is preferably removed.

11 Claims, No Drawings

SULFURIZED MANNICH BASES AS LUBRICATING OIL DISPERSANT

This application is a division of application Ser. No. 397,414, filed Sept. 14, 1973, now U.S. Pat. No. 3,904,595.

BACKGROUND

A large percentage of today's automobiles are used in city stop-and-go driving where the engines do not reach their most efficient operating temperatures. Large amounts of partial oxidation products are formed and reach the crankcase of the engine by blowing past the piston rings. These partial oxidation products react with oil in the crankcase and lead to the formation of deposits on various operating parts of engines, resulting in sludge and varnish. Other deposits and organic acids result from deterioration of the oil itself. To prevent deposition of these materials on various engine parts, it is necessary to incorporate dispersants in the lubricating oil compositions, thus keeping these polymeric products highly dispersed in a condition unfavorable for deposition on metals.

For the most part, the various dispersants which have been used to effectively disperse the precursors of sludges and varnishes are metal organic compounds such as calcium alkarylsulfonate. These dispersants also neutralize to some extent the organic acids, and thereby help prevent corrosion of the engine parts. However, such dispersants have the disadvantage of forming ash deposits in the engine, which deposits lower engine performance by fouling spark plugs and valves and by contributing to preignition.

SUMMARY

According to the present invention, lubricating oil compositions are provided having good dispersant activity and improved wear and anticorrosion properties. This is accomplished by adding a small but effective amount of the product made by heating a mixture of sulfur with a condensation product of a high molecular weight alkyl-substituted phenol, a reactive amine and an aldehyde.

DESCRIPTION OF THE PREFERRED EMBODIMENTS

A preferred embodiment of this invention is a product made by the process comprising heating to a temperature of about 50°–300° C a mixture of (1) from about 1–20 parts by weight of sulfur and (2) about 100 parts by weight of a condensation product made by reacting about (a) one mole part of a high molecular weight alkylphenol wherein said alkyl has a molecular weight of from about 600–3000, (b) about 0.1–10 mole parts of an amine containing from 1 to about 20 carbon atoms and having at least one >NH group, and (c) about 0.1–10 mole parts of an aliphaic aldehyde containing from 1 to about 6 carbon atoms.

The condensation product of a phenol, formaldehyde and a reactive amine is known as a Mannich condensation product. The Mannich condensation products used in making the present additives are known. They are described in Otto, U.S. Pat. No. 3,368,972, and Worrel, U.S. Pat. No. 3,413,347, incorporated fully herein by reference.

The preferred alkylphenols used to prepare the Mannich product are the polyolefin-substituted phenols which are readily made by alkylating phenol with a polyolefin having an average molecular weight of about 600–3000 using a BF₃ phenate catalyst. The preferred polyolefins are polymers of $C_{2-10}$ olefins such as ethylene, propylene, butene, isobutene, octene-1, isooctene, decene-1, and the like. The more preferred polyolefin-substituted phenols are polypropylene and polybutene-substituted phenols in which the polypropylene or polybutene substituents have an average molecular weight of about 600–3000, and more preferably 750–1500. A particularly preferred phenol is a polyisobutenesubstituted phenol in which the polyisobutene group has a molecular weight of 750–1500.

The amine reactant can be any amine containing at least one >NH group capable of entering into a Mannich condensation reaction. Preferably, the amine is an aliphatic amine containing 1 to about 20 carbon atoms such as methylamine, dimethylamine, ethylamine, diethylamine, n-propylamine, n-butylamine, isobutylamine, sec-butylamine, n-hexylamine, 2-ethylhexylamine, laurylamine, oleylamine, stearylamine and eicosylamine. Other useful reactive amines include the cyclic amines such as piperidine, morpholine, piperazine, and the like.

One preferred class of amines is the polyalkylenepolyamines, in particular, polyethylenepolyamines. These amines are fully described in Kirk-Othmer, "Encyclopedia of Chemical Technology," Vol. 5, pp. 898–905. They can be represented by the following formula:

wherein $x$ is an integer from 1 to about 6. They can be used individually but are preferably used as mixtures. One such mixture is marketed commercially by Union Carbide Chemical Company as "Polyamine H" (trade name). Examples of the polyethylenepolyamines are ethylenediamine, diethylenetriamine, triethylenetetramine, tetraethylenepentamine, and the like, including mixtures thereof.

Another preferred class of useful amines is the N,N-dialkyl-alkanediamines. Preferably, the N-alkyl groups contain from 1 to about 6 carbon atoms and the divalent alkane group contains from 2 to about 6 carbon atoms. Examples of these are N,N-dimethyl-ethylenediamine, N,N-diethyl-1,3-propanediamine, N,N-dimethyl-1,3-propanediamine, N,N-diisobutyl-1,6-hexanediamine, N,N-dimethyl-1,6-hexanediamine, N,N-di-n-hexyl-1,4-butanediamine, N-methyl-N-hexyl-1,3-propanediamine, and the like. Of these, the most preferred is N,N-dimethyl-1,3-propanediamine.

Still further useful amines include ethanol amine, diethanol amine, N-methyl ethylamine, N-methyl octylamine, aniline, N-methyl aniline, N-cyclohexylaniline, dibutylamine, cyclohexylamine, di(p-methylphenyl)amine, dodecylamine, octadecylamine, o-phenylenediamine, N,N'-di-n-butyl-p-phenylenediamine, morpholine, piperzine, tetrahydropyrazine, indole, hexahydro-1,3,5-triazine, 1-H-1,2,4-triazole, melamine, bis-(p-aminophenyl)methane, phenylmethylenimine, menthanediamine, cyclohexamine, pyrrolidine, 3-amino-5,6-diphenyl-1,2,4-triazine, quinonediimine, 1,3-indandimine, 2-octadecyl-imidazoline, 2-phenyl-4-methyl-imidazolidine, oxazolidine, and 2-heptyloxazolidine.

Hydroxyalkyl-substituted alkylene amines, i.e., alkylene amines having one or more hydroxyalkyl substituents on the nitrogen atoms, likewise are contemplated for use herein. The hydroxyalkyl-substituted alkylene amines are preferably those in which the alkyl group is a lower alkyl group, i.e., having less than about 6 carbon atoms. Examples of such amines include N-(2-hydroxyethyl)ethylene diamine, N,N'-bis(2-hydroxyethyl)-ethylene diamine, 1-(2-hydroxyethyl)piperazine, mono-hydroxypropyl-substituted diethylene triamine, 1,4-bis(2-hydroxypropyl)-piperazine, dihydroxypropyl-substituted tetraethylene pentamine, N-(3-hydroxypropyl)tetramethylene diamine, and 2-heptadecyl-1-(2-hydroxyethyl)imidazoline.

Other sources of the nitrogen-containing group include ureas, thioureas, hydrazines, guanidines, amidines, amides, thioamides, cyanamides, etc. Specific examples illustrating such compounds are: hydrazine, phenylhydrazine, N,N'-diphenylhydrazine, octadecylhydrazine, benzoylkydrazine, urea, thiourea, N-butylurea, stearylamide, oleylamide, guanidine, 1,3-diphenylguanidine, 1,2,3-tributylguanidine, benzamidine, octadecamidine, N,N'-dimethylstearamidine, cyanamide, dicyandiamide, guanylurea, aminoguandine, etc.

The aldehyde reactant can be any aldehyde containing from 1 to about 6 carbon atoms such as formaldehyde, actaldehyde, propionaldehyde, butyraldehyde, valeraldehyde, hexaldehyde, and the like. The more preferred aldehyde reactants are the low molecular weight aliphatic aldehydes containing from 1 to about 4 carbon atoms such as formaldehyde, acetaldehyde, butyraldehyde, isobutyraldehyde, and the like. The most preferred aldehyde is formaldehyde, which may be used in its monomeric or polymeric form such as paraformaldehyde. The mole ratio of the reactants used in making the condensation product is one mole of alkylphenol: 0.1–10 moles of amine:0.1–10 moles of aliphatic aldehyde. A more preferred ratio is one mole of alkylphenol:0.5–3.0 moles of amine:1.0–5.0 moles of aliphatic aldehyde.

The Mannich condensation product can be made by merely mixing the alkylphenol, reactive amine and aldehyde in the proper ratio and heating the mixture to reaction temperature. A suitable reaction temperature is about 50°–200° C, and preferably 75°–175° C. The condensation can be conducted without a solvent or a solvent may be included. Suitable solvents are hydrocarbons having a boiling range of from about 70°–200° C. These include both aliphatic and aromatic hydrocarbons such as heptanes, octanes, nonanes, benzene, toluene, xylene, mineral oils, and the like. Alcohols such as isopropanol can also be used. Optionally, the alkylphenol and amine may be first heated to reaction temperature and then the aldehyde added at once, or over a period of time as the reaction proceeds. Likewise, the aldehyde and aliphatic amine may be first mixed and heated and the alkylphenol added to this mixture, or this mixture added to the alkylphenol.

The following examples illustrate the manner in which the Mannich condensation product is prepared.

EXAMPLE 1

To a reaction vessel equipped with a stirrer, condenser and thermometer was added 363 parts of polybutene having an average molecular weight of 1100 and 94 parts of phenol. Over a period of 3 hours, 14.2 parts of a 48 percent $BF_3$-etherate complex was added while maintaining the reaction temperature between 50° and 60° C. The reaction mixture was then stirred at 55°–60° C for an additional 4.5 and then transferred to a section reaction vessel containing 750 parts of water. The aqueous phase was removed and the organic phase washed 4 times with 250 parts of water at 60° C, removing the aqueous phase after each wash. The organic product was then diluted with about 200 parts of n-hexane and dried with anhydrous sodium sulfate. The product was then filtered and the hexane and other volatiles removed by vacuum distillation until the product remaining was at 75° C at 0.3 mm Hg. As a reaction product, there was obtained 368.9 parts of an alkylphenol as a viscous amber-colored oil having an average molecular weight of 810.

In a separate reaction vessel was placed 267 parts of the alkylphenol prepared above, 33.6 parts of N,N-dimethyl-1,3-propanediamine and 330 parts of isopropanol. While stirring, 15.8 parts of 95 percent paraformaldehyde was added. The reaction mixture was then refluxed for 6.5 hours. Following this, the solvent and other volatiles were distilled out to a reaction mass temperature of 115° C at about 15 mm Hg. The reaction product was a viscous amber-colored liquid.

EXAMPLE 2

In a reaction vessel was placed 933 grams of heptane, 495 grams of phenol and 3,298 grams of polybutene (average molecular weight 1,000). An additional 315 grams of heptane was added and the mixture stirred at 40°–45° C. Over a 2 hour period, 147 grams of $BF_3$ phenate was added while stirring at 40°–50° C. Stirring was continued for one hour at 50° C and then 972 grams of methanol was added. Following this, 662 grams of aqueous ammonia was added and the mixture heated to 60° C. Stirring was stopped and the mixture allowed to separate. The bottom aqueous layer was drained off. The remaining product was washed with 972 grams of methanol at 70° C and again allowed to separate, following which the bottom layer was drained off.

Temperature of the mixture was adjusted to 30° C. and 365 grams of N,N-dimethyl-1,3-propanediamine and 171 grams of paraformaldehyde was added. The mixture was stirred for 30 minutes at 35°–40° C., following which the vessel was evacuated to 100 mm. Hg. and volatiles distilled off up to a liquid temperature of 150° C. The residue was then diluted with 1313 grams of an aromatic solvent (Hysol 7D) giving a condensation product suitable for use in preparing the sulfurized reaction products of this invention.

The sulfurized reaction product is prepared by adding elemental sulfur to the Mannich condensation product and heating the mixture to about 50°–300° C. while stirring. The condensation product used in this reaction need not be purified. It can be subjected to the sulfurization reaction as it comes from the condensation reaction.

Preferably, the sulfur is in the form of finely-divided powder. The amount of sulfur added can vary over a wide range. A useful range is about 1–20 parts by weight of sulfur for each 100 parts of condensation product. Excess sulfur can be used and any unreacted sulfur remaining after sulfurization can be removed by such conventional methods as centrifugation or filtration.

The following example illustrates the manner by which the sulfurized reaction products are made.

EXAMPLE 3

A solution was prepared containing 335 grams of the condensation product prepared in Example 2 and 165 grams of SAE-7 mineral oil. To this was added 5 grams of sublimed sulfur and the mixture stirred at 120°–125° C. for 10 hours. The clear viscous product was cooled, resulting in an effective lubricating oil dispersant having improved antiwear and anticorrosion properties.

The above general procedure can readily be followed to prepare a wide variety of reaction products of this invention by substituting any of the condensation products previously described and reacting them with various amounts of sulfur at various temperatures.

Tests were carried out to demonstrate the improved properties of the reaction products. In these tests lubricating oil blend was prepared containing 0.5 weight percent of a phenolic antioxidant, 0.5 weight percent of tetrapropenyl succinic anhydride, 0.5 weight percent sulfurized synthetic sperm oil and 0.05 weight percent benzotriazole. To a portion of this blend was added 5 weight percent of the condensation product from Example 2 and to a second portion was added 5 weight percent of the sulfurized reaction product of Example 3. A clean weighed copper-lead bearing was placed in each sample. The samples were heated to 325° F. and air bubbled through them at a rate of 48 liters/hour for 96 hours. At the end of this time the bearing were removed, cleaned and weighed. Bearing weight loss was used as a criteria of the additive's anticorrosion properties. The results obtained were as follows:

| Additive | Bearing Wt. Loss |
| --- | --- |
| Example 2 | 416 mg. |
| Example 3 | 14 mg. |

As these results show, the sulfurized reaction product greatly reduced the corrosivity of the lubricating oil when compared to the same oil blend containing the unsulfurized condensation product.

Further tests were carried out to demonstrate the antiwear properties of the new additive. These were 4-ball wear tests in which the central ball of a 4 ball pyramid is rotated at 1800 r.p.m. under a 50 Kg load and the balls lubricated with an SAE-20 mineral oil at 110° C. Criteria of effectiveness is the average diameter of the scar which forms on the three stationary balls. The smaller the scan diameter the more effective the antiwear additive. One oil contained 5 weight percent of the additive of Example 2 and the other oil contained 5 weight percent of the sulfurized additive of Example 3. The results are shown in the following table.

| Additive | Scar Diameter (mm) |
| --- | --- |
| Example 2 | 2.75, 2.65 |
| Example 3 | 2.02, 2.16 |

The above tests demonstrate that the dispersants of the present invention possess both anticorrosion and antiwear properties.

The amount of reaction product added to the lubricating oil should be a small but effective amount — that is, it should be enough to impart the desired dispersancy, antiwear and anticorrosion properties to the oil. A useful range is from 0.3 to about 10 weight percent. A more preferred range is from 1 to about 5 weight percent.

Other additives normally added to lubricating oil can be included in the formulated oil. These include metal sulfonates such as calcium alkarylsulfonates and magnesium alkarylsulfonates, zinc dialkyldithiophosphates, antioxidants such as 4,4'-methylenebis(2,6-di-tert-butylphenol), viscosity index improvers such as polylaurylmethacrylates, polybutenes and ethylenepropylene copolymers. Likewise, metal phenates such as barium or zinc alkylphenates or sulfur-bridged metal phenates may be included. Phosphosulfurized hydrocarbons and their metal salts may be added such as the reaction product of $P_2S_5$ with terpenes or polybutenes and their barium salts.

The following example illustrates the preparation of a typical automotive engine lubricating oil using the dispersant of this invention.

EXAMPLE 4

In a blending vessel place 1000 gallons of SAE-20 mineral lubricating oil. To it add an amount of a commercial zinc dialkyldithiophosphate to provide 0.15 weight percent Zn, a commerical overbased calcium alkarylsulfonate to provide 0.25 weight percent Ca, 5 weight percent of a commercial ethylene-propylene copolymer V.I. improver and 3 weight percent of the additive of Example 3. Stir until completely homogenous to obtain a lubricating oil which is useful as an internal combustion engine lubricant.

We claim:

1. Mineral lubricating oil containing a dispersant amount of a product made by the process comprising heating to a temperature of about 50°–300° C a mixture of (1) from about 1–20 parts by weight of elemental sulfur and (2) about 100 parts by weight of a condensation product made by reacting about (a) one molar part of a high molecular weight alkylphenol wherein said alkyl has a molecular weight of from about 600–3000, (b) about 0.1–10 mole parts of an amine containing from 1 to about 20 carbon atoms and having at least one > NH group capable of entering into a Mannich condensation reaction, and (c) about 0.1–10 mole parts of an aliphatic aldehyde containing from 1 to about 6 carbon atoms.

2. A composition of claim 1 wherein said alkylphenol is a polyolefin-substituted phenol and said aldehyde is formaldehyde.

3. A composition of claim 2 wherein said polyolefin-substituted phenol is a polypropylene-substituted phenol.

4. A composition of claim 2 wherein said polyolefin-substituted phenol is a polybutene-substituted phenol.

5. A composition of claim 2 wherein said amine is a polyethylene polyamine having the formula:

$$H_2N + CH_2-Ch_2NH +_x H$$

wherein $x$ is an integer from 1 to about 6 and mixtures thereof.

6. A composition of claim 5 wherein said polyolefin-substituted phenol is a polypropylene-substituted phenol.

7. A composition of claim 5 wherein said polyolefin-substituted phenol is a polybutene-substituted phenol.

8. A composition of claim 2 wherein said amine is an N,N-dialkyl-alkanediamine.

9. A composition of claim 8 wherein said polyolefin substituted phenol is a polybutene-substituted phenol.

10. A composition of claim 9 wherein said alkanediamine is N,N-dimethyl-1,3-propanediamine.

11. A composition of claim 10 wherein said polybutene substituent has an average molecular weight of about 750–1500.

* * * * *